United States Patent
Tsai

(10) Patent No.: US 9,630,254 B2
(45) Date of Patent: Apr. 25, 2017

(54) TAILSTOCK DEVICE

(71) Applicant: Alex-Tech Machinery Industrial Co., Ltd., Taichung (TW)

(72) Inventor: Peter T. H. Tsai, Taipei (TW)

(73) Assignee: Alex-Tech Machinery Industrial Co., Ltd., Taichung (TW)

( * ) Notice: Subject to any disclaimer, the term of this patent is extended or adjusted under 35 U.S.C. 154(b) by 185 days.

(21) Appl. No.: 14/747,130

(22) Filed: Jun. 23, 2015

(65) Prior Publication Data
US 2016/0089725 A1 Mar. 31, 2016

(30) Foreign Application Priority Data
Sep. 25, 2014 (TW) .............................. 103133238 A

(51) Int. Cl.
*B23B 23/00* (2006.01)
*B23B 43/00* (2006.01)

(52) U.S. Cl.
CPC .............. *B23B 23/00* (2013.01); *B23B 43/00* (2013.01)

(58) Field of Classification Search
CPC ....... B23B 23/00; B23B 23/02; B23B 23/025; B23B 23/04; B23B 23/045; B23B 23/005; B23B 43/00; B23B 25/06; B23B 29/32; B23B 29/323; B23Q 2039/008
See application file for complete search history.

(56) References Cited

U.S. PATENT DOCUMENTS

| | | | | | |
|---|---|---|---|---|---|
| 2,946,249 | A | * | 7/1960 | Swanson | B23B 5/00 74/824 |
| 3,316,786 | A | * | 5/1967 | Coate | B23Q 3/15553 483/27 |
| 3,491,566 | A | * | 1/1970 | Hurd | B21H 8/005 492/30 |
| 4,006,518 | A | * | 2/1977 | Rudolph | B23B 3/161 29/27 R |
| 2007/0209179 | A1 | * | 9/2007 | Williams | B23B 11/00 29/27 C |
| 2008/0216622 | A1 | * | 9/2008 | Hall | B23B 3/02 82/171 |
| 2011/0067535 | A1 | * | 3/2011 | Tsai | B23B 3/167 82/121 |
| 2011/0290089 | A1 | * | 12/2011 | Martens | B23B 3/065 82/121 |
| 2013/0276600 | A1 | * | 10/2013 | Tsai | B23B 23/00 82/121 |

* cited by examiner

*Primary Examiner* — Will Fridie, Jr.
(74) *Attorney, Agent, or Firm* — Trop Pruner & Hu, P.C.

(57) ABSTRACT

A tailstock device includes a lower transport unit, a base seat, and a tool unit. The lower transport unit includes a lower transmission mechanism that has a lower leadscrew adapted to be rotatably installed on a bed of a lathe machine and extending in a lengthwise direction. The base seat threadedly engages the lower leadscrew and is driven movably by the transport unit along the lower leadscrew. The tool unit is mounted on the base seat, is movable relative to the base seat in a crosswise direction transverse to the lengthwise direction, and has a lathe center adapted to point toward a headstock of the lathe machine and a carriage adapted to be mounted with a deep-hole drilling tool. The carriage and the lathe center are arranged in the crosswise direction.

12 Claims, 4 Drawing Sheets

TAILSTOCK DEVICE

CROSS REFERENCE TO RELATED APPLICATION

This application claims priority of Taiwanese Patent Application No. 103133238, filed on Sep. 25, 2014, the disclosure of which is incorporated herein by reference.

FIELD

The disclosure relates to a tailstock of a lathe machine, more particularly to a tailstock device for a lathe machine.

BACKGROUND

A conventional lathe machine generally includes a bed, a headstock that is mounted on the bed and that has a chuck rotatably holding a workpiece, a turret that is movably mounted on the bed and installed with different types of machining tools for processing the workpiece, a motor that drives the turret to move, a tailstock that is movably mounted on the bed and separably engaged with the turret, and a deep-hole drilling tool that is installed on the tailstock to operate deep-hole drilling on the workpiece.

Due to such structure of the conventional lathe machine, an operator must activate the motor to move the turret, then engage the turret with the tailstock, and drag the tailstock exactly to a desired position for an electrically-controlled deep-hole drilling operation on the workpiece, in which the turret serves as nothing more than a part of mechanical transmission for moving the tailstock. Moreover, due to a vibration caused by collision between the deep-hole drilling tool and the workpiece during the operation of the conventional lathe machine, the engagement between the turret and the tailstock may be loosened to form a backlash therebetween, thereby affecting operational accuracy of the conventional lathe machine.

SUMMARY

Therefore, the object of the disclosure is to provide a tailstock device that can independently and accurately operate the deep-hole drilling.

Accordingly, a tailstock device is adapted to be mounted on a lathe machine. The lathe machine includes a bed and a headstock that is mounted on the bed for holding a workpiece. The tailstock device is adapted to be spaced apart from the headstock and includes a lower transport unit, a base seat, and a tool unit. The lower transport unit includes a lower transmission mechanism having a lower leadscrew that is adapted to be rotatably installed on the bed and that extends in a lengthwise direction. The base seat threadedly engages the lower leadscrew and is driven movably by the lower transport unit along the lower leadscrew. The tool unit is mounted on the base seat, is movable relative to the base seat in a crosswise direction transverse to the lengthwise direction, and has a lathe center adapted to point toward the headstock, and a carriage adapted to be mounted with a deep-hole drilling tool. The carriage and the lathe center are arranged in the crosswise direction.

BRIEF DESCRIPTION OF THE DRAWINGS

Other features and advantages of the disclosure will become apparent in the following detailed description of the embodiment with reference to the accompanying drawings, of which.

DETAILED DESCRIPTION OF THE EMBODIMENT

Figure 1:
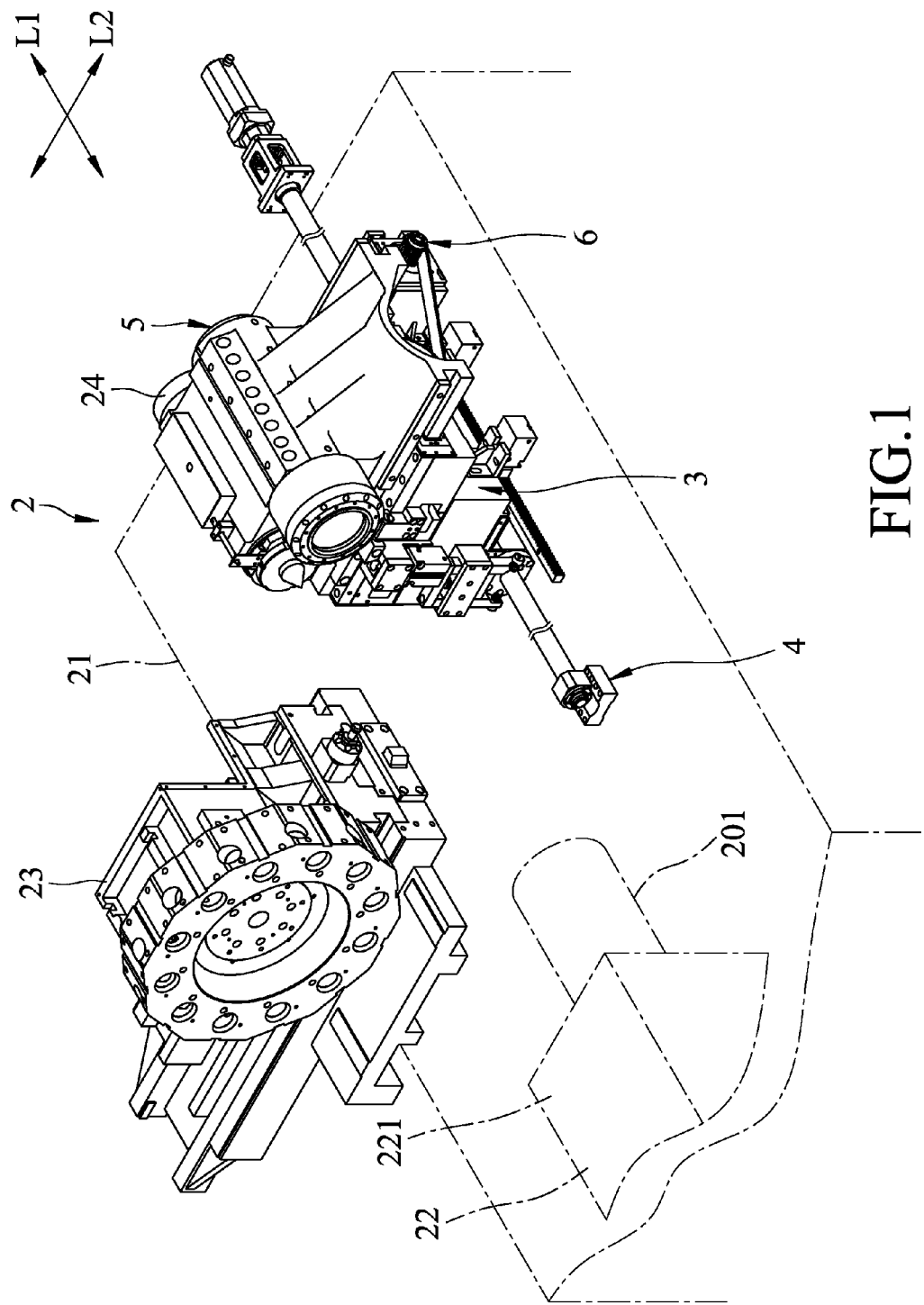
FIG. 1 is a perspective view illustrating an embodiment of a tailstock device according to the disclosure, which is adapted to be mounted on a lathe machine.
Figure 2:
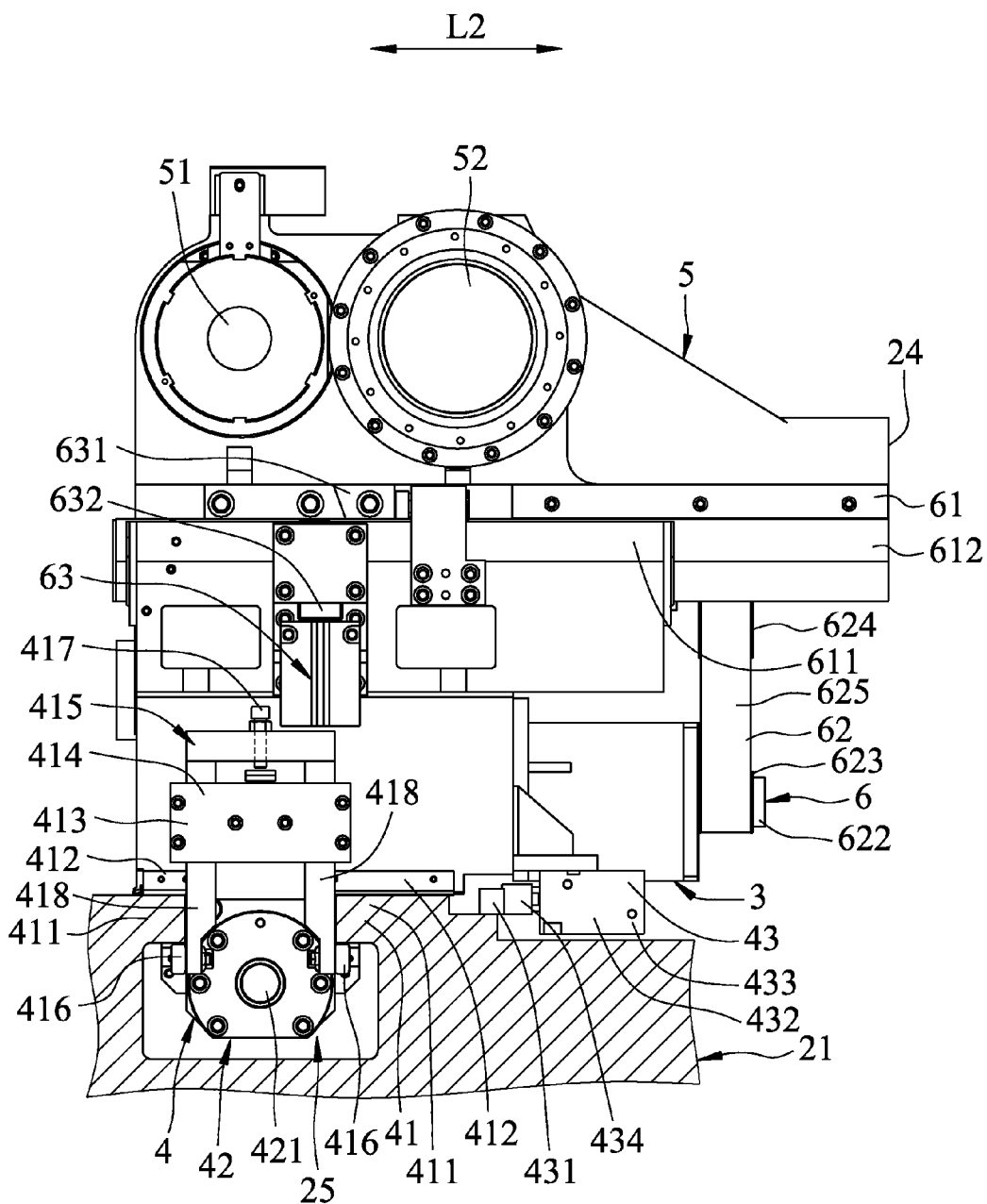
FIG. 2 is a sectional view of the embodiment.

Referring to FIGS. 1 to 4, an embodiment of a tailstock device 24 according to the disclosure is illustrated. The tailstock device 24 is adapted to be mounted on a lathe machine 2, which includes a bed 21, a headstock 22 that is mounted on the bed 21 and that has a chuck 221 for rotatably holding a workpiece 201, and a turret 23 that is to be installed with different types of machine tools (not shown) and that is movable to process the workpiece 201 with the machine tools. Moreover, the lathe machine 2 is formed with an inverted T-shaped space 25 (see FIG. 2) that extends in a lengthwise direction (L1).

The tailstock device 24 is adapted to be spaced apart from the headstock 22, and includes a lower transport unit 4 mounted to the bed 21, a base seat 3 driven movably on the bed 21 by the lower transport unit 4 in the lengthwise direction (L1), a tool unit 5 mounted on the base seat 3 and movable relative to the base seat 3 in a crosswise direction (L2) that is transverse to the lengthwise direction (L1), and an upper transport unit 6 installed on the base seat 3 for driving the tool unit 5 to move.

The lower transport unit 4 includes a lower guiding mechanism 41, a lower transmission mechanism 42, and a lower brake mechanism 43.

The lower guiding mechanism 41 includes two first lower guiding members 411 adapted to be connected to the bed 21 and spaced apart from each other, two second lower guiding members 412 connected to the base seat 3 and respectively and slidably coupled to the first lower guiding members 411, and a tightness controller 413 connected to the base seat 3 and operable for maintaining slidable contact between the first and second lower guiding members 411, 412.

In the embodiment, the first lower guiding members 411 are adapted to be embedded into the bed 21 of the lathe machine 2, and to define a top opening of the inverted T-shaped slide space 25. Each of the second lower guiding members 412 has a plain surface contacting slidably a top surface of a respective one of the first lower guiding members 411 so as to steady the movement of the base seat 3 relative to the bed 21 and to wipe off any fallen chips from the cut workpiece 201 during operation. However, the structure of the first lower guiding member 411 and the second lower guiding member 412 may also be altered to be a linear guide rail mechanism, and is not limited by the embodiment.

The tightness controller 413 includes a support block 414 that is connected to the base seat 3, an inverted U-shaped extending member 415 that has two leg segments 418 extending through the support block 414 into the inverted T-shaped space 25, two rollers 416 that are disposed in the inverted T-shaped space 25 and that are connected respectively to the leg segments 418 of the extending member 415, and an adjusting screw 417 that extends threadedly through the extending member 415 and that abuts against the support block 414. Furthermore, the adjusting screw 417 is turnable to adjust a position of the extending member 415 relative to the support block 414 until the two rollers 416 rotatably and respectively contact the two first lower guiding members 411, and to control the rollers 416 to loosely or tightly contact the first lower guiding members 411, thereby controlling contact tightness between the first and second lower guiding members 411, 412.

The lower transmission mechanism 42 has a lower leadscrew 421 that is adapted to be rotatably installed in the inverted T-shaped space 25 and that extends in the lengthwise direction (L1), and a lower motor 422 (see FIG. 3) that is disposed for driving rotation of the lower leadscrew 421. The lower leadscrew 421 threadedly engages the base seat 3, so that the base seat 3 is movable along the lower leadscrew 421. The lower motor 422 may be a servo motor.

In this embodiment, the lower brake mechanism 43 includes a teeth rack 431 adapted to be mounted fixedly to the bed 21, and two stoppers 432 connected to the base seat 3 and separably engaging the teeth rack 431. Each of the stoppers 432 includes a pneumatic cylinder 433, and teeth 434 driven movably to separably engage the teeth rack 431 so as to fixedly position the base seat 3. Also, it should be noted that the number of the stopper 432 may vary and is not limited by the embodiment.

The tool unit 5 is driven movably by the upper transport unit 6 to move in the crosswise direction (L2). The tool unit 5 has a lathe center 51 adapted to point toward the headstock 22, and a carriage 52 adapted to be mounted with a deep-hole drilling tool 202 and being extendable to move the deep-hole drilling tool 202 in the lengthwise direction (L1). The carriage 52 and the lathe center 51 are arranged in the crosswise direction (L2).

The upper transport unit 6 includes an upper guiding mechanism 61, an upper transmission mechanism 62, and a limiting mechanism 63.

The upper transmission mechanism 62 has an upper leadscrew 621 rotatably installed on the base seat 3, an upper motor 622 for driving rotation of the upper leadscrew 621, a drive gear 623 connected to and driven rotatably by the upper motor 622, a driven gear 624 co-rotatably connected to the upper lead screw 621, and a linking member 625 that links the drive gear 623 and driven gear 624 so that the drive gear 623 and the driven gear 624 are co-rotatable with each other. In the embodiment, the linking member 625 is a timing belt for such reasons as being lighter in weight, being less expensive and being quieter in operation. However, the linking member 625 is not limited by the embodiment, and may be a timing chain or a roller chain for greater durability. Moreover, the drive gear 623 has a diameter shorter than that of the driven gear 624 so that the driven gear 624 rotates in a rotational speed slower than that of the drive gear 623, thus allowing for more precise control of the upper leadscrew 621.

The upper guiding mechanism 61 includes two first upper guiding members 611 connected to the base seat 3 and spaced apart from each other in the lengthwise direction (L1), and a second upper guiding member 612 connected to the tool unit 5, slidably coupled to the first upper guiding members 611, and threadedly engaging the upper leadscrew 621 of the upper transmission mechanism 62.

Figure 3:
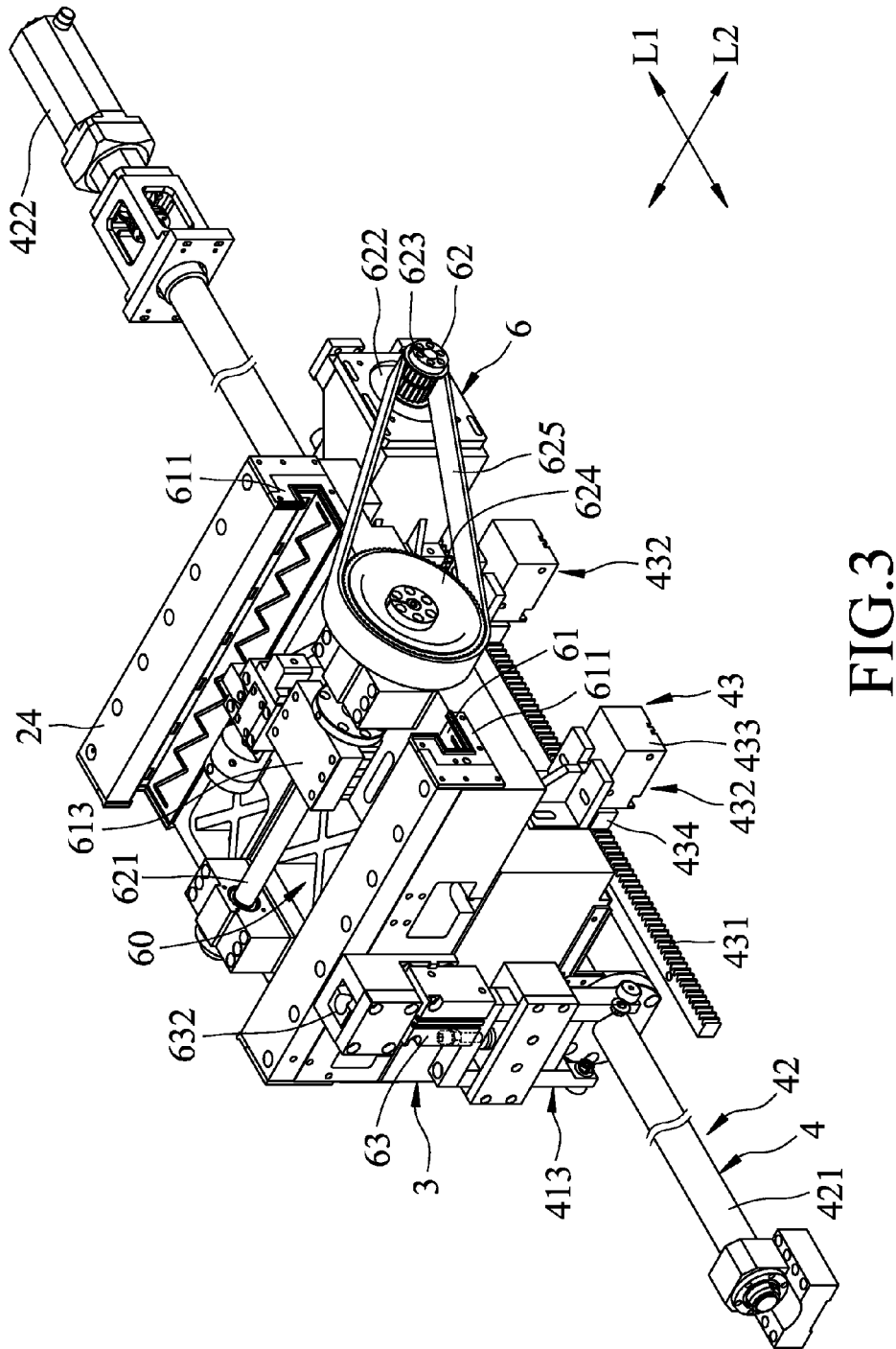
FIG. 3 is fragmentary perspective view illustrating a lower transport unit, a base unit, and an upper transport unit of the embodiment.
Figure 4:
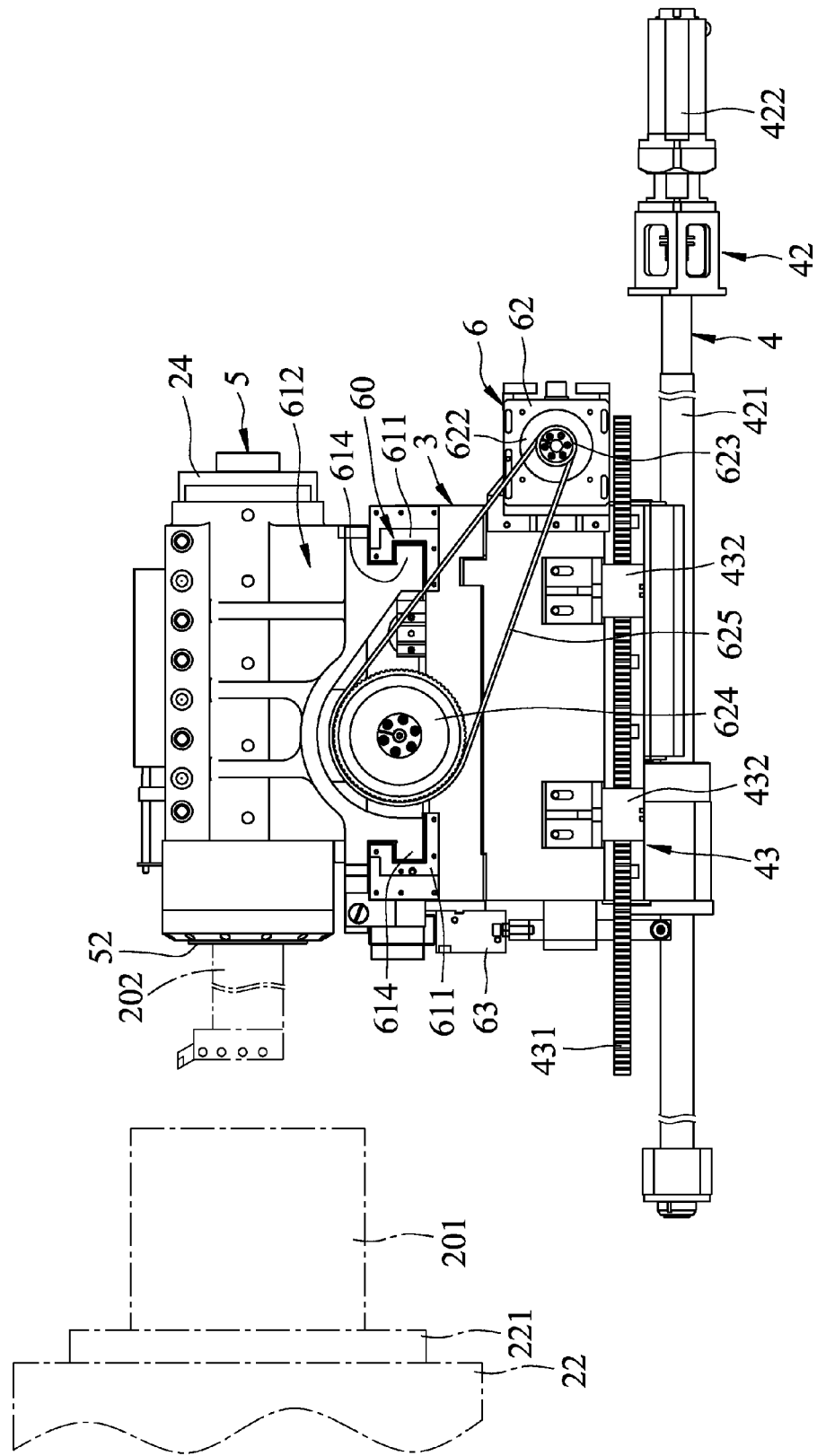
FIG. 4 is a fragmentary side view of the embodiment.

As shown in FIGS. 3 and 4, the first upper guiding members 611 cooperatively define an inverted T-shaped track space 60 therebetween. The second upper guiding member 612 has a nut part 613 that threadedly engages the upper leadscrew 621 of the upper transmission mechanism 62, and two tongue parts 614 that are connected to the nut part 613, that flank the nut part 613, and that are slidably and respectively coupled to the first upper guiding members 611.

As such, the tool unit 5 is able to move along the upper leadscrew 621, and the engagement between the tongue parts 614 and the first upper guide members 611 can steady the abovementioned movement of the tool unit 5.

In the embodiment, the limiting mechanism 63 includes a contact component 631 (see FIG. 2) that is mounted to the tool unit 5, and a limiting component 632 that is mounted to the base seat 3 and operable to engage the contact component 631 for positioning the lathe center 51 relative to the headstock 22. By virtue of the configuration of the limiting mechanism 63, the lathe center 51 is able to be accurately co-axial with the workpiece 201 when the limiting component 632 extends upward and engages the contact component 631. It should be noted that the arrangement of the contact component 631 and the limiting component 632 is not limited by the embodiment. For example, the locations of the contact component 631 and the limiting component 632 may be interchanged.

When using the turret 23 of the lathe machine 2 for regular machining operations on workpieces 201, an operator can utilize the tailstock device 24 of the disclosure for improved operational accuracy. First, the upper motor 622 is activated to drive rotation of the upper leadscrew 621 and move the tool unit 5 until the lathe center 51 is positioned to co-axially aim at the workpiece 201 and is locked by the limiting mechanism 63. Next, the lower motor 422 is activated to drive rotation of the upper leadscrew 421 and move the base seat 3 together with the tool unit 5. Once the lathe center 51 contacts and secures the workpiece 201, the lower brake mechanism 43 activates to hold the tool unit 5 still, so that the operator can move the turret 23 to process the workpiece 201 with less inaccuracy from operating vibrations.

As shown in FIG. 4, when operating the tailstock device 24 for deep-hole drilling on the workpiece 201, as the deep-hole drilling tool 202 is installed on the carriage 52 of the tool unit 5, the operator can move the tool unit 5 in the lengthwise direction (L1) via the lower transfer unit 4, and in the crosswise direction (L2) via the upper transport unit 6, to independently process the workpiece 201 without the turret 23. Furthermore, the operator may use the tightness controller 413 of the lower guiding mechanism 41 to ensure steady and precise movements of the tool unit 5 for accurate operation.

In a summary view of the foregoing embodiment, by virtue of the lower transfer unit 4 and the upper transport unit 6, the tailstock device 24 according to the disclosure is able to independently conduct the deep-hole drilling. By virtue of the tightness controller 413, the tailstock device 24 is able to perform steady and precise movements of the tool unit 5 for accurate operation. Furthermore, by virtue of the lower brake mechanism 43, the tailstock device 24 is able to hold the lathe center 51 of the tool unit 5 still, thus improving operational accuracy for the turret 23 of the lathe machine 2.

While the present invention has been described in connection with what is considered the exemplary embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A tailstock device adapted to be mounted on a lathe machine, the lathe machine including a bed and a headstock that is mounted on the bed for holding a workpiece, said tailstock device being adapted to be spaced apart from the headstock and comprising:
   a lower transport unit that includes a lower transmission mechanism having a lower leadscrew that is adapted to be rotatably installed on the bed and that extends in a lengthwise direction;
   a base seat that threadedly engages said lower leadscrew and that is driven movably by said lower transport unit along said lower leadscrew; and
   a tool unit that is mounted on said base seat, that is movable relative to said base seat in a crosswise direction transverse to the lengthwise direction, and that has
      a lathe center adapted to point toward the headstock, and
      a carriage adapted to be mounted with a deep-hole drilling tool, said carriage and said lathe center being arranged in the crosswise direction.

2. The tailstock device as claimed in claim 1, further comprising an upper transport unit that includes an upper transmission mechanism having an upper leadscrew that is rotatably installed on said base seat, said tool unit being driven movably by said upper transport unit along said upper leadscrew.

3. The tailstock device as claimed in claim 2, wherein said upper transmission mechanism further has an upper motor for driving rotation of said upper leadscrew.

4. The tailstock device as claimed in claim 3, wherein said upper transmission mechanism further has:
   a drive gear that is connected to and driven rotatably by said upper motor;
   a driven gear that is co-rotatably connected to said upper lead screw of said upper transmission mechanism; and
   a linking member that links said drive gear and driven gear so that said drive gear and said driven gear are co-rotatable with each other.

5. The tailstock device as claimed in claim 2, wherein said upper transport unit further includes an upper guiding mechanism including:
   two first upper guiding members that are connected to said base seat and spaced apart from each other; and
   a second upper guiding member that is connected to said tool unit, that is slidably coupled to said first upper guiding members, and that threadedly engages said upper leadscrew of said upper transmission mechanism.

6. The tailstock device as claimed in claim 5, wherein:
   said first upper guiding members of said upper guiding mechanism define an inverted T-shaped track space therebetween; and
   said second upper guiding member has
      a nut part that threadedly engages said upper leadscrew of said upper transmission mechanism, and
      two tongue parts that are connected to said nut part and that are slidably and respectively coupled to said first upper guiding members.

7. The tailstock device as claimed in claim 1, wherein said lower transport unit further includes a lower guiding mechanism that includes:
   two first lower guiding members adapted to be connected to the bed and spaced apart from each other; and
   two second lower guiding members connected to said base seat and respectively and slidably coupled to said first lower guiding members.

8. The tailstock device as claimed in claim 7, wherein said lower guiding mechanism further includes a tightness controller that is connected to said base seat and that is operable for maintaining slidable contact between said first and second lower guiding members.

9. The tailstock device as claimed in claim 8, wherein:
   the bed of the lathe machine is formed with an inverted T-shaped slide space that extends along the lengthwise direction;
   said first lower guiding members are adapted to be embedded into the bed of the lathe machine and to define a top opening of the inverted T-shaped slide space; and
   said tightness controller includes
      a support block that is connected to said base seat,
      an inverted U-shaped extending member that has two leg segments extending through said support block into the inverted T-shaped slide space,
      two rollers that are adapted to be disposed in the inverted T-shaped slide space and that are connected respectively to said leg segments of said extending member for rotatably and respectively contacting said first lower guiding members, and
      an adjusting screw that extends threadedly through said extending member, that abuts against said support block, and that is operable to control contact tightness between said first and second lower guiding members.

10. The tailstock device as claimed in claim 7, wherein said lower transport unit further includes a lower brake mechanism that includes:
   a teeth rack adapted to be mounted fixedly to the bed; and
   at least one stopper connected to said base seat and separably engaging said teeth rack.

11. The tailstock device as claimed in claim 2, wherein said upper transport unit further includes a limiting mechanism that includes:
   a contact component mounted to one of said base seat and said tool unit; and
   a limiting component mounted to the other one of said base seat and said tool unit, and operable to engage said contact component for positioning said lathe center relative to the headstock.

12. The tailstock device as claimed in claim 1, wherein said lower transmission mechanism further has a lower motor for driving rotation of said lower leadscrew.

* * * * *